(12) United States Patent  
Nishikawa (10) Patent No.: US 9,112,757 B2  
(45) Date of Patent: Aug. 18, 2015

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 14/472,888

(22) Filed: Aug. 29, 2014

(65) Prior Publication Data

US 2015/0098520 A1    Apr. 9, 2015

(30) Foreign Application Priority Data

Oct. 8, 2013   (JP) .................................. 2013-210881

(51) Int. Cl.
*H04L 25/49* (2006.01)
*H04L 27/26* (2006.01)

(52) U.S. Cl.
CPC ............ *H04L 27/262* (2013.01); *H04L 27/265* (2013.01); *H04L 27/2628* (2013.01)

(58) Field of Classification Search
CPC ............ H04L 27/2614; H04L 27/2615; H04L 27/3411
USPC ......................................... 375/260, 295–297
See application file for complete search history.

(56) References Cited

U.S. PATENT DOCUMENTS

| 7,028,246 | B2* | 4/2006 | Kim et al. ...................... 714/784 |
| 7,660,360 | B2* | 2/2010 | Yue et al. ...................... 375/260 |
| 2004/0008616 | A1* | 1/2004 | Jung et al. ..................... 370/203 |
| 2004/0141458 | A1* | 7/2004 | Park et al. ..................... 370/208 |
| 2006/0098747 | A1* | 5/2006 | Yue et al. ...................... 375/260 |
| 2009/0003478 | A1* | 1/2009 | Kim et al. ...................... 375/260 |
| 2009/0147870 | A1* | 6/2009 | Lin et al. ....................... 375/260 |

FOREIGN PATENT DOCUMENTS

JP       2006-165781       6/2006

* cited by examiner

*Primary Examiner* — Tesfaldet Bocure
(74) *Attorney, Agent, or Firm* — Warner Norcross & Judd LLP (57) ABSTRACT

An identification provider provides predetermined identification data to an input signal, and generates a first signal. A differential encoder performs a differential encoding of a data series that is an aggregate of data having a matching number of elements to that contained in the first signal, and generates a second signal. A modulator modulates each of the first and second signals using a primary modulation, and generates first and second modulated data. An IFFT calculator performs an inverse fast Fourier transformation on each of the first and second modulated data, and generates first and second inverse transformed data. A selector compares peak-to-average power ratios calculated by baseband signals associated with the first and second inverse transformed data, and selects a baseband signal having the lower peak-to-average power ratio. A transmitter generates a transmission signal based on the selected baseband signal, and transmits the transmission signal.

12 Claims, 8 Drawing Sheets

— EMBODIMENT
--- CONVENTIONAL ART

NUMBER OF ELEMENTS S IN FIRST HEADER

FIG. 9

—— EMBODIMENT
--- CONVENTIONAL ART

FIG. 10

COMMUNICATION DEVICE AND COMMUNICATION METHOD

CROSS-REFERENCE TO RELATED APPLICATION

This application claims the benefit of Japanese Patent Application No. 2013-210881 filed on Oct. 8, 2013, the entire disclosure of which is incorporated by reference herein.

FIELD

This application relates to a communication device and a communication method.

BACKGROUND

In OFDM (Orthogonal Frequency-Division Multiplexing) communication, an input signal is applied a subcarrier modulation, and is subjected to IFFT (Inverse Fast Fourier Transformation) to generate a baseband signal. As a result of this, the number of subcarriers is increased and baseband signals having high peaks are generated, thereby causing high PAPR (Peak-to-Average Power Ratio). A high PAPR requires amplifiers that exhibit linearity across a wide region in order to achieve distortion-free transmissions of signals. In this regard, techniques for PAPR reduction have been proposed.

In order to reduce PAPR, an orthogonal frequency-division multiplexing communication device according to Unexamined Japanese Patent Application Kokai Publication No. 2006-165781, performs, prior to executing IFFT, a subcarrier modulated signal phase control based on a calculated optimal phase, that is calculated using a sequential decision procedure.

In OFDM communication, a reduction of PAPR is the issue that has been addressed. The orthogonal frequency-division multiplexing communication device according to Unexamined Japanese Patent Application Kokai Publication No. 2006-165781, requires iterative calculations to obtain an optimal phase for minimizing PAPR and requires individual phase control per each subcarrier.

SUMMARY

In view of the aforementioned problems, it is therefore an object of the present invention to provide a reduction of PAPR in OFDM communication.

According to a first aspect of the present invention, the object is achieved by a communication device that communicates with another device in an orthogonal frequency-division multiplexing wireless communication, including, an identification provider that provides predetermined identification data to an input signal, and generates a first signal;

a differential encoder that performs a differential encoding of a data series, that is an aggregate of data having a matching number of elements to that contained in the first signal, and generates a second signal;

a modulator that modulates each of the first signal and the second signal using a primary modulation, and generates first modulated data and second modulated data;

an IFFT calculator that performs an inverse fast Fourier transformation on each of the first modulated data and the second modulated data, and generates first inverse transformed data and second inverse transformed data;

a selector that compares a peak-to-average power ratio calculated by a baseband signal associated with the first inverse transformed data and a peak-to-average power ratio calculated by a baseband signal associated with the second inverse transformed data, and selects a baseband signal having a lower peak-to-average power ratio; and a transmitter that generates a transmission signal based on the selected baseband signal, and transmits the transmission signal.

Preferably, the predetermined identification data includes first identification data having an arbitrary number of elements and second identification data having a predetermined number of elements, and the data series is capable of identifying elements of the input signal and elements of the predetermined identification data based on the number of elements in the second identification data.

Preferably, the elements of the first identification data are constituted by all 1s or all 0s, and the elements of the second identification data are constituted by all 0s if the elements of the first identification data are all 1s, and that the elements of the second identification data are constituted by all 1s if the elements of the first identification data are all 0s.

Preferably, the number of elements in the predetermined identification data is set based on a probability of occurrence of a low peak-to-average power ratio of the baseband signal.

Preferably, the number of elements in the first identification data is set to have a peak-to-average power ratio that is lowest within a range that is set based on a probability of occurrence of the low peak-to-average power ratio of the baseband signal.

Preferably, the differential encoder performs an exclusive-OR on each element of the first signal and a one or more than one bit delayed element yielded by an exclusive-OR of the second signal, such that the second signal is generated.

According to a second aspect of present invention, a communication device that communicates with another device in orthogonal frequency-division multiplexing wireless communication, including, a receiver that receives a transmission signal and generates a baseband signal;

an FFT calculator that performs a fast Fourier transformation on a parallel signal generated by a serial-to-parallel conversion performed on the baseband signal, and generates transformed data;

a demodulator that demodulates the transformed data using a primary modulation and generates a demodulated signal;

a determiner that determines whether a data series contains elements from a predetermined identification data, where the data series is an aggregate of data having a matching number of elements to that contained in the demodulated signal;

a differential decoder that performs a differential decoding of the data series if the data series does not contain any elements of the predetermined identification data, and generates a decoded signal; and an identification eliminator that eliminates the elements of the predetermined identification data contained in the demodulated signal if the data series contains the elements from the predetermined identification data, and eliminates the elements of the predetermined identification data contained in the decoded signal if the data series does not contain the elements from the predetermined identification data, such that a restored signal is output.

Preferably, the predetermined identification data comprises first identification data having an arbitrary number of elements and second identification data having a predetermined number of elements, and the identification eliminator identifies whether a data series of the demodulated signal and a data series of the decoded signal contain the elements of the predetermined identification data, based on the number of elements contained in the second identification data.

Preferably, the predetermined identification data comprises first identification data having an arbitrary number of elements and a second identification data having a predetermined number of elements, and the determiner determines whether the elements of the predetermined identification data are contained in the data series, based on the number of elements contained in the second identification data.

Preferably, the differential decoder performs an exclusive-OR on each element of the data series and a one bit or more than one bit delayed element of the data series, if the data series does not contain any elements of the predetermined identification data, such that the decoded signal is generated.

According to a third aspect of the present invention, a communication method for a communication device that communicates with another device in orthogonal frequency-division multiplexing wireless communication, including the steps of, providing predetermined identification data to an input signal, and generating a first signal;

performing a differential encoding on a data series that is an aggregate of data having a matching number of elements to that contained in the first signal, and generating a second signal;

modulating each of the first signal and the second signal using a primary modulation, and generating first modulated data and second modulated data;

performing an inverse fast Fourier transformation on the first modulated data and the second modulated data, respectively, and generating first inverse transformed data and second inverse transformed data;

comparing a peak-to-average power ratio calculated by a baseband signal associated with the first inverse transformed data and a peak-to-average power ratio calculated by a baseband signal associated with the second inverse transformed data, and selecting a baseband signal having a lower peak-to-average power ratio; and generating a transmission signal based on the selected baseband signal, and transmitting the transmission signal.

According to a fourth aspect of the present invention, a communication method for a communication device that communicates with another device in orthogonal frequency-division multiplexing wireless communication, including the steps of, receiving a transmission signal and generating a baseband signal;

performing a fast Fourier transformation on a parallel signal generated by a serial-to-parallel conversion on the baseband signal, and generating transformed data;

demodulating the transformed data using a primary modulation and generating a demodulated signal;

determining whether a data series contains elements of predetermined identification data, that is an aggregate of data having a matching number of elements to that contained in the demodulated signal;

performing a differential decoding of the data series if the data series does not contain any elements of the predetermined identification data, and generating a decoded signal; and eliminating the elements of the predetermined identification data contained in the demodulated signal if the data series contains the elements of the predetermined identification data, and eliminating the elements of the predetermined identification data contained in the decoded signal if the data series does not contain any elements of the predetermined identification data, such that a restored signal is output.

According to the present invention, a reduction of PAPR in OFDM communication can be achieved.

BRIEF DESCRIPTION OF THE DRAWINGS

A more complete understanding of this application can be obtained when the following detailed description is considered in conjunction with the following drawings, in which.

DETAILED DESCRIPTION

Hereinafter, an embodiment of the present disclosure is described with reference to the figures. Note that in the figures, the same or equivalent portions denote the same reference numbers. In the following description, the term IFFT (Inverse Fast Fourier Transformation) encompasses both IFFT and IDFT (Inverse Discrete Fourier Transformation). The Embodiment of the present disclosure may therefore be configured to perform IDFT as an alternative to IFFT. Similarly, the term FFT (Fast Fourier Transformation) described herein encompasses both FFT and DFT (Discrete Fourier Transformation). In performing IDFT and DFT, the term, an FFT size, is used to mean a DFT size in the following description.

Figure 1:
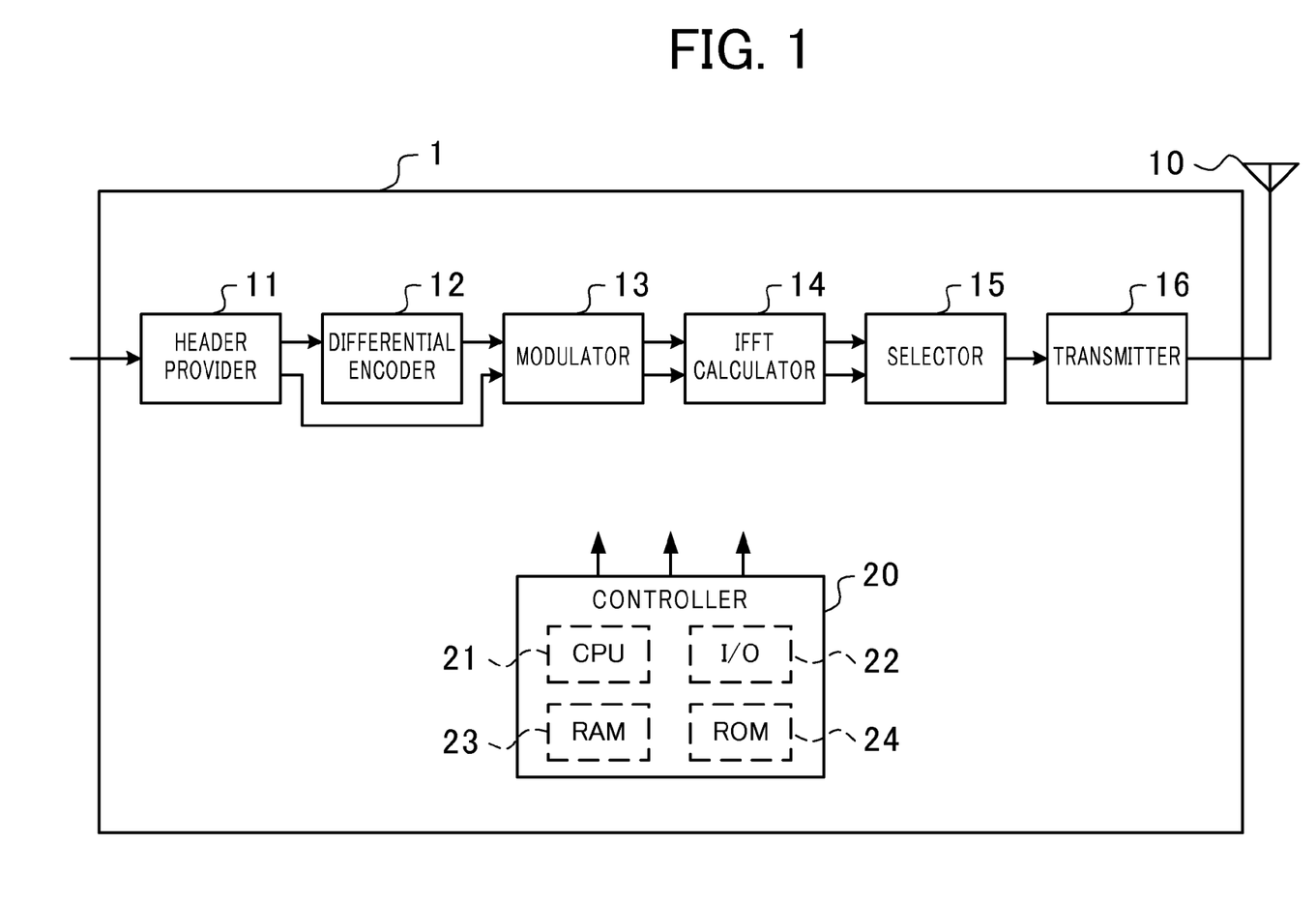
FIG. 1 is a block diagram representing an example of configuration of a communication device according to an embodiment of the present disclosure.

FIG. 1 is a block diagram representing an example of configuration relevant to a communication device according to the embodiment of the present disclosure. A communication device 1 communicates with another device in OFDM (Orthogonal Frequency-Division Multiplexing) wireless communication. The communication device 1 includes an antenna 10, a header provider (identification provider) 11, a differential encoder 12, a modulator 13, an IFFT calculator 14, a selector 15, a transmitter 16 and a controller 20.

A controller 20 includes a CPU (Central Processing Unit) 21, a RAM (Random Access Memory) 23, and a ROM (Read-Only Memory) 24. For the sake of clarity and brevity, signal lines between the controller 20 and each component are omitted, yet it is to be understood that the controller 20 is connected to each component of the communication device 1 via an I/O (Input/Output) 22 so that the controller 20 allows for processes by such components to be triggered, terminated, and also, specific processes to be controlled.

A RAM 23 stores data for generating a transmission signal such as a predetermined header (identification data), which will be discussed later. A ROM 24 stores a control program for the controller 20 to control an operation of the communication device 1. The controller 20 controls the communication device 1 according to a control program.

Figure 2:
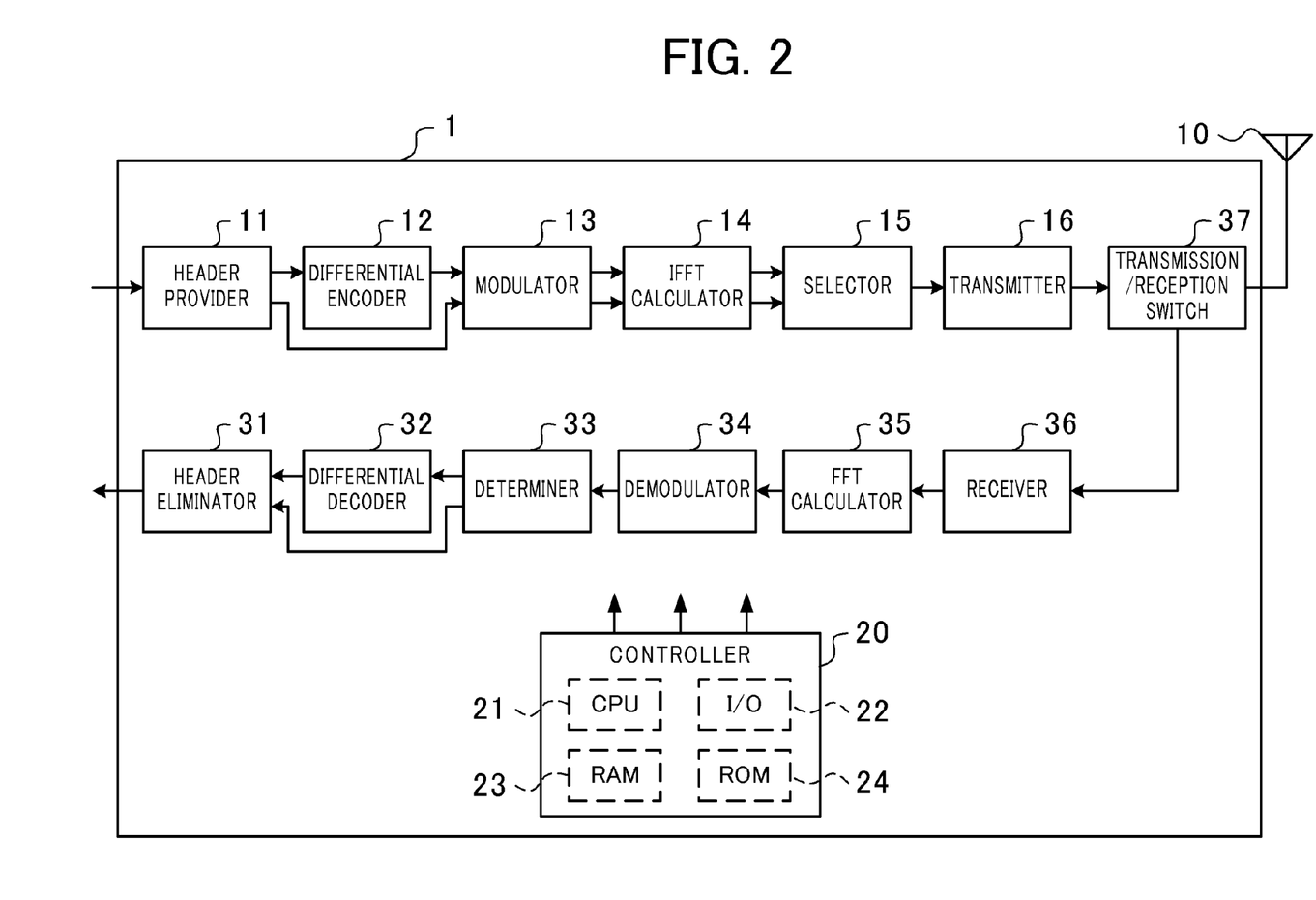
FIG. 2 is a block diagram representing an example of another variation of configuration relevant to a communication device according to an embodiment of the present disclosure.

FIG. 2 is a block diagram representing an example of another variation of configuration for the communication device according to an embodiment. To implement a receiving feature in the aforementioned communication device 1, the communication device 1 illustrated in FIG. 2 further includes a header eliminator (identification eliminator) 31, a differential decoder 32, a determiner 33, a demodulator 34, an FFT calculator 35, receiver 36 and a transmission/reception switch 37. Hereinafter, a communication method carried out by the communication device 1 in reference to the communication device 1 presented in FIG. 2 that includes a receiver feature and transmission feature is described.

The header provider 11 provides a predetermined header to an input signal (input digital signal, transmission data), generates a first signal (a header attached input signal), and sends the generated first signal to the differential encoder 12 and to the modulator 13. Note that a data series employed as the input signal in the embodiment herein contains elements (components) where values for each element (each component) are either 0s or 1s. The header in the embodiment includes a first header (first identification data) and a second header (second identification data). Further, the first header represents a data series containing s-elements, where s is a natural number and every element is constituted by value 1, and the second header represents a data series containing t-elements, where t is a natural number and every element is constituted by value 0 in the embodiment. Yet further, in order to perform IFFT using the IFFT calculator 14, and also to perform the primary modulation using the modulator 13, the first signal of the embodiment is set to have (N×M) elements, which are obtained by multiplying natural numbers N (FFT size) by M (number of bits that simultaneous transmissions using the primary modulation are capable of). In this regard, the input signal of the embodiment herein is set to have (N×M−s−t) elements.

Thus, if the input signal, for example, denotes d=[$d_1$ $d_2$ ... $d_{N\times M-s-t}$]; the first header denotes $x_s$=[11 ... 1]; the second header denotes $z_t$=[00 ... 0]; and the first signal denotes a=[$a_1$ $a_2$ ... $a_{N\times M}$], then, $a_1$=$a_2$= ... =$a_s$=1; $a_{s+1}a_{s+2}$=$a_{s+t}$=0; $a_{s+t+1}$=$d_1$; and $a_{s+t+2}$=$d_2$, ..., $a_{N\times M}$=$d_{N\times M-s-t}$, can be established. That is to say, the first signal a is written by a formula (1) as below:

$$a=[x_s, z_t, d]=[11\ldots100\ldots0d_1d_2\ldots d_{N\times M-s-t}] \quad (1)$$

The differential encoder 12 performs a differential encoding on a data series, that is an aggregate of data in which the number of data matches the number of elements in the first signal a, then the differential encoder 12 generates the second signal (differential encoded signal), and sends the generated second signal to the modulator 13.

Figure 3A:
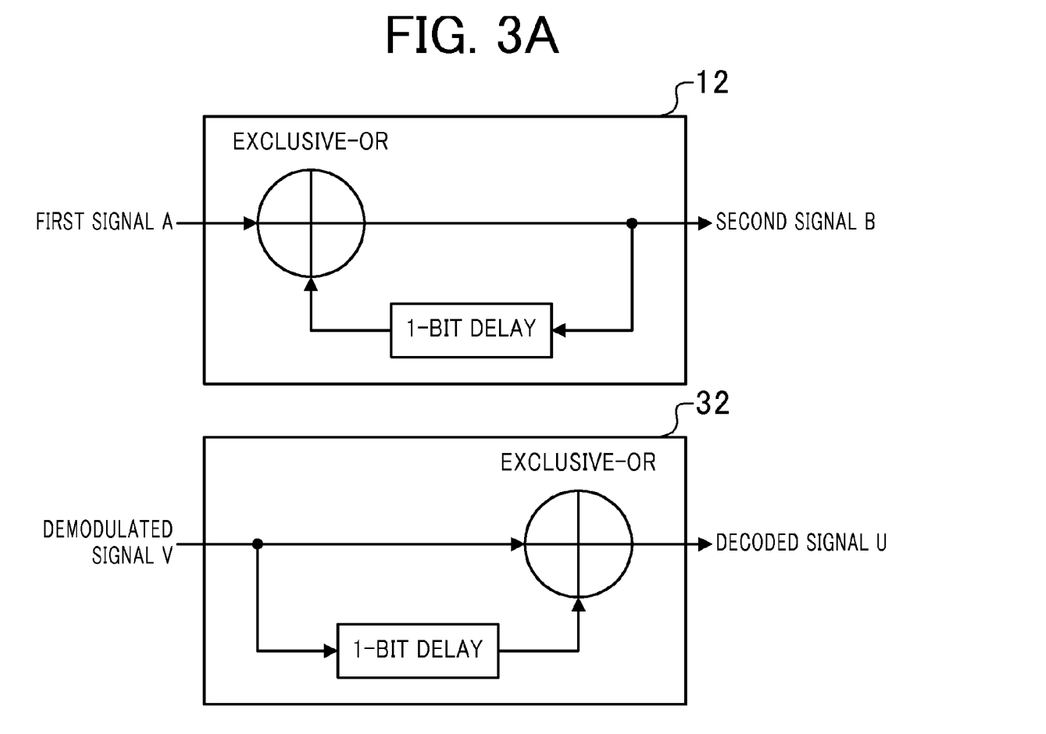
FIG. 3A and FIG. 3B illustrate an example of a differential encoder and a differential decoder of a communication device according to an embodiment of the present disclosure.

In specific, as presented in FIG. 3A, the differential encoder 12 of the embodiment herein generates the second signal containing the elements obtained by an exclusive-OR performed in sequence from the first-bit elements ($a_1$=1) to the (N×M)th bit elements ($a_{N\times M}$=$d_{N\times M-s-t}$) of the first signal a, on each element of the first signal a and each one-bit delay element of the second signal in which an exclusive-OR has been performed. To give an example, let the first signal denote, a=[$a_1$ $a_2$ ... $a_{N\times M}$], and the second signal denote, b=[$b_1$ $b_2$ ... $b_{N\times M}$], then the element $b_1$ in the first bit position of the second signal b can be obtained by an exclusive-OR operation performed on the element $a_1$ in a first bit position of the first signal a and an initial value of 0. Further, the elements $b_2$ to $b_{N\times M}$ in the second bit position and subsequent bit positions of the second signal b, are respectively obtained by an exclusive-OR operation performed on the elements $a_2$ to $a_{N\times M}$ in the second bit position and subsequent bit positions of the first signal a, and the one-bit delay elements $b_1$ to $b_{N\times M-1}$.

That is to say, $b_1$=XOR($a_1$, 0), $b_2$=XOR($a_2$, $b_1$), ..., $b_{N\times M}$=XOR($a_{N\times M}$, $b_{N\times M-1}$) are established, and thus, the second signal b is expressed by a formula (2) below:

$$b=[XOR(a_1,0)XOR(a_2,b_1)\ldots XOR(a_{N\times M},b_{N\times M-1})] \quad (2)$$

Figure 3B:
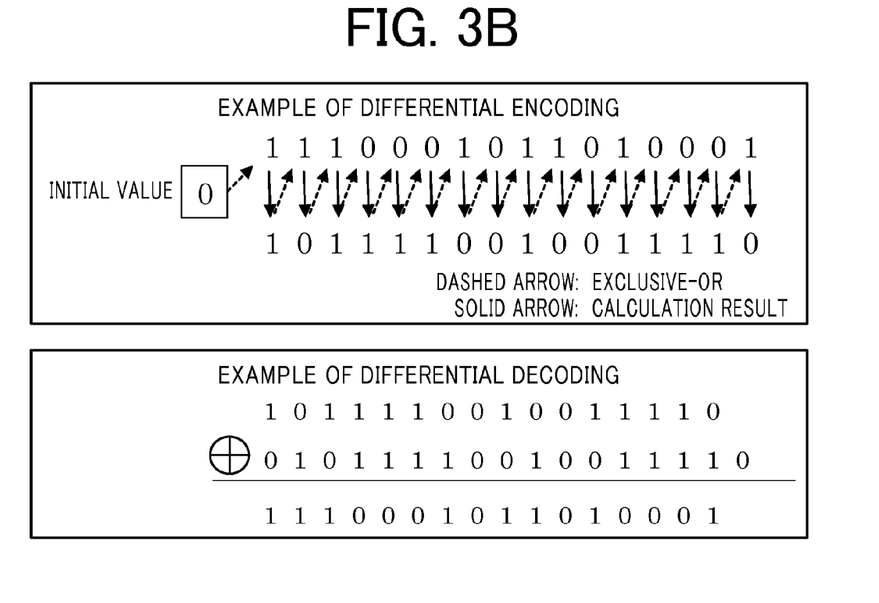

As shown in FIG. 3B, suppose that s=t=3, N×M=16, and a=[1110001011010001], which give $b_1$=XOR(1, 0)=1, $b_2$=XOR(1, 1)=0, ..., $b_{16}$=XOR(1, 1)=0, and that the generated second signal b denotes b=[1011110010011110].

The modulator 13 modulates the first signal a and the second signal b, respectively using the primary modulation, and generates the first modulated data and the second modulated data, and further sends the generated first modulated data and the second modulated data to the IFFT calculator 14. In the embodiment, QPSK (Quadrature Phase-Shift Keying), for example, is employed for the primary modulation. In this way, since two-bit data can be simultaneously transmitted, M=2 is established.

The IFFT calculator 14 performs a serial-to-parallel conversion of the first modulated data and the second modulated data, then performs IFFT on the serial-to-parallel converted first modulated data and the second modulated data, and further, the IFFT calculator 14 generates a first inverse transformed data and a second inverse transformed data, and sends the generated first inverse transformed data and the second inverse transformed data to the selector 15. The size of the FFT used in this embodiment is set as 2048. Accordingly, N=2048 is established.

The selector 15 calculates PAPR of a baseband signal associated with the first inverse transformed data, and calculates PAPR of a baseband signal associated with the second inverse transformed data, then the selector 15 selects the baseband signal having the lower PAPR between the two baseband signals, and sends the selected baseband signal to the transmitter 16.

The transmitter 16 generates a transmission signal based on the baseband signal selected by the selector 15, and transmits the transmission signal to other devices via the antenna 10. If the communication device 1 is to comprise a receiver feature, the transmitter 16 is then configured to transmit the generated transmission signals to other devices via the transmission/reception switch 37 and the antenna 10 as presented in FIG. 2.

Figure 4:
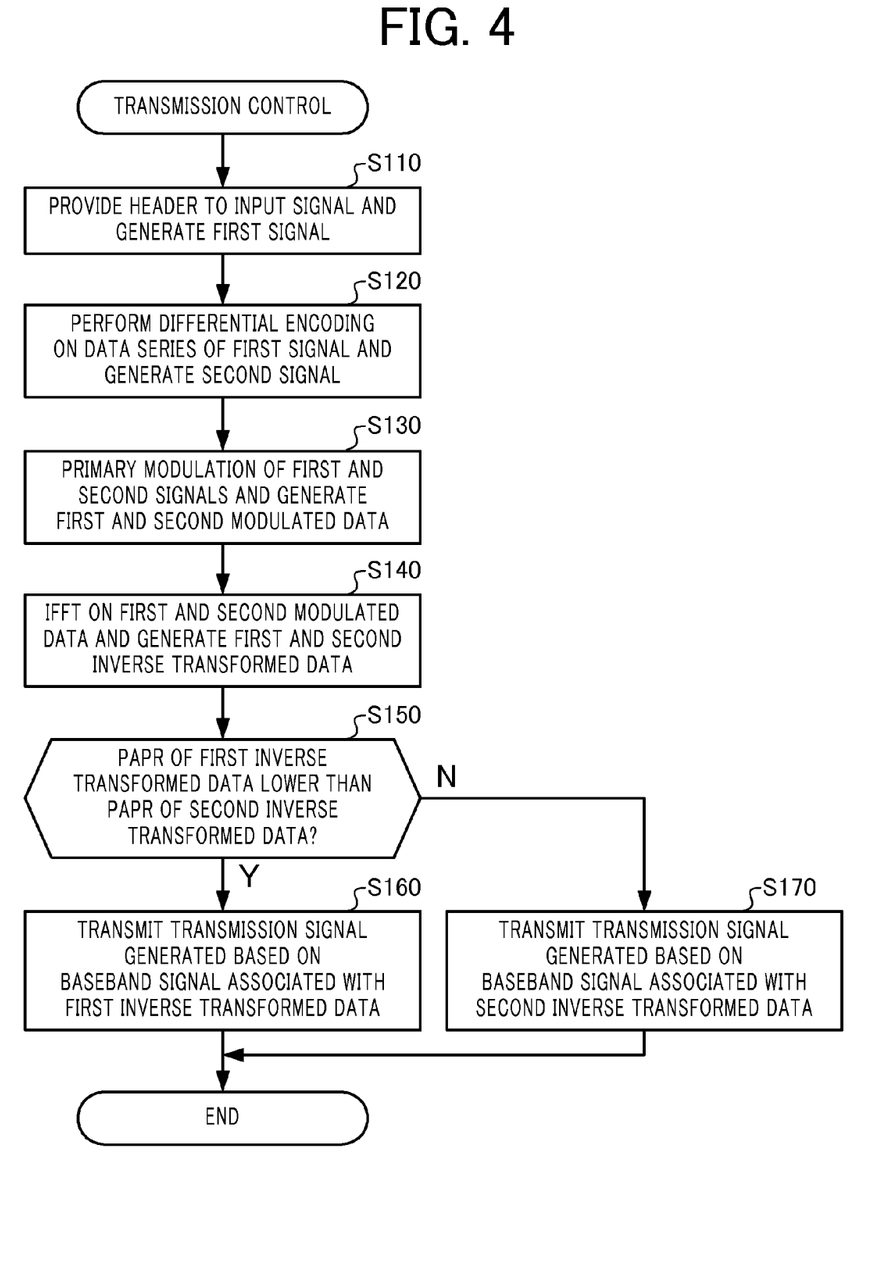
FIG. 4 is a flowchart representing an example of an operation of a transmission control performed by a communication device according to an embodiment of the present disclosure.

FIG. 4 is a flow chart showing an example of operation with regard to a transmission control performed by the communication device according to the embodiment. The header provider 11 provides a predetermined header to an input signal (input digital signal, transmission data) and generates a first signal (step S110). The differential encoder 12 performs a differential encoding of a data series in a first signal 2 to generate a second signal b (step S120). The modulator 13 modulates each of the first signal and the second signal b using the primary modulation such that a first modulated data and a second modulated data are generated (step S130). The IFFT calculator 14 performs serial-to-parallel conversions and performs IFFT of the first modulated data and the second modulated data, and further generates a first inverse transformed data and a second inverse transformed data (step S140). The selector 15 determines whether the PAPR of the baseband signal associated with the first inverse transformed data exhibits lower PAPR than the PAPR in the baseband signal associated with the second inverse transformed data (step S150).

The selector 15 selects the baseband signal associated with the first inverse transformed data if the PAPR of the baseband signal associated with the first inverse transformed data exhibits lower PAPR than the PAPR of the baseband signal associated with the second inverse transformed data (step S150; Y). The transmitter 16 generates a transmission signal based on the selected baseband signal associated with the selected first inverse transformed data and transmits the transmission signal to other devices (step S160). At this point, the processes involved in the transmission-side are complete.

On the other hand, the selector 15 selects the baseband signal associated with the second inverse transformed data if the PAPR of the baseband signal associated with the first inverse transformed data is equal to or greater than the PAPR of the baseband signal associated with the second inverse transformed data (step S150; N). The transmitter 16 then generates a transmission signal based on the selected baseband signal associated with the second inverse transformed data and transmits the signal to other devices (step S170). At this point, the processes involved in the transmission-side are complete.

Hereinafter, processes involving a receiver-side are described. The receiver 36 receives a transmission signal via the antenna and the transmission/reception switch 37, then generates a baseband signal, and further sends the generated baseband signal to the FFT calculator 35.

The FFT calculator 35 performs FFT on a parallel signal that is generated by the serial-to-parallel conversion of the baseband signal, further, the FFT calculator 35 generates a transformed data and sends this transformed data to the demodulator 34.

The demodulator 34 demodulates the transformed data using the primary modulation, generates a demodulated signal, then sends this demodulated signal to the determiner 33.

The determiner 33 determines whether the data series of the demodulated signal contains header elements (a first header $x_s$ and a second header $z_t$).

In detail, a value s that represents a number of elements contained in the first header, and a value t that represents a number of elements contained in the second header are stored on the RAM 23 in the embodiment described herein, so that the determiner 33 of the embodiment determines whether all s-elements equivalent to the first header within the data series of the demodulated signal are constituted by 1s. By this, whether the data series of the demodulated signal contains the header elements is determined.

In this embodiment, let the demodulated signal denote, for example, $v=[v_1 \; v_2 \; \ldots \; v_{N \times M}]$; elements from the first-bit position $v_1$ to the sth-bit position $v_s$ of the demodulated signal v denote $w_s=[v_1 \; v_2 \; \ldots \; v_s]$; the elements of the demodulated signal v from (s+1)th bit position $v_{s+1}$ to (s+t)th bit position $v_{s+t}$, denote $y_t=[v_{s+1} \; v_{s+2} \; \ldots \; v_{s+t}]$; and the elements of the demodulated signal v from (s+t+1) bit position $v_{s+t+1}$ to (N×M) bit position $v_{N \times M}$ denote $c=[v_{s+t+1} \; v_{s+t+2} \; \ldots \; v_{N \times M}]$, which then give $v=[w_s \; y_t \; c]$. Therefore, the determiner 33 in this embodiment is configured to determine whether $v_1 = v_2 = \ldots = v_s = 1$ can be established.

Consequently, the determiner 33 in the embodiment herein sends the demodulated signal to the header eliminator 31 if the data series of the demodulated signal is determined to have contained the header elements, while sends the demodulated signal to the differential decoder 32 if the data series of the demodulated signal is determined not to have contained any header elements.

The differential decoder 32 performs differential decoding on the data series of the demodulated signal v if the data series of the demodulated signal v contains header elements (first header $x_s$, second header $z_t$), then generates a decoded signal, and further sends the generated decoded signal to the header eliminator 31.

In specific, in response to the demodulated signal v that is sent from the determiner 33, the differential decoder 32 in the embodiment generates the decoded signal constituted by elements obtained via the exclusive-OR operation performed on each element of the demodulated signal v and an each one-bit delay element of the demodulated signal v, where the exclusive-OR is performed in sequence from the element $v_1$ in the first-bit position to the element $v_{N \times M}$ in (N×M)th bit position of the demodulated signal v, as presented in FIG. 3A. To give an example, let a decoded signal denote $u=[u_1 \; u_2 \; \ldots \; u_{N \times M}]$, then an element $u_1$ in the first-bit position of the decoded signal u can be obtained using an exclusive-OR on the element $v_1$ in the first-bit position of the demodulated signal and an initial value 0. Further, elements $u_2$ to $u_{N \times M}$ in the second-bit position and subsequent bit positions of the decoded signal u are respectively obtained using the exclusive-OR operation on the elements $v_2$ to $v_{N \times M}$ in the second-bit and subsequent bit positions of the demodulated signal v and one-bit delay elements $v_1$ to $v_{N \times M-1}$ of the demodulated signal v.

That is to say, $u_1 = XOR(v_1, 0)$, $u_2 = XOR(v_2, v_1)$, ..., $u_{N \times M} = XOR(v_{N \times M}, v_{N \times M-1})$ are established, and thus the decoded signal u is expressed by a formula (3) below:

$$u = [XOR(v_1, 0) \, XOR(v_2, v_1) \ldots XOR(v_{N \times M}, v_{N \times M-1})] \quad (3)$$

As presented in FIG. 3B, suppose, for instance, s=t=3, N×M=16, and v=[1011110010011110], which then can give $u_1=XOR(1, 0)=1$, and $u_2=XOR(0, 1)=1$, ..., $u_{16}=XOR(0, 1)=0$, so that the generated decoded signal u can be written by u=[1110001011010001].

The header eliminator 31 eliminates the header elements contained in the demodulated signal v if the data series of the demodulated signal v contains the header elements. At the same time, the header eliminator 31 eliminates the header elements contained in the decoded signal u if the data series of the demodulated signal v does not contain the header elements, and further, the header eliminator 31 outputs a restored signal. In this, the header eliminator 31 determines whether the s-elements equivalent to the first header contained within data series of the demodulated signal and contained within the data series of the decoded signal are constituted entirely by 1s, such that whether each data series of the demodulated signal and decoded signal contains the header elements is identified.

In detail, in response to the decoded signal u sent from the differential decoder 32, the header eliminator 31 of the embodiment eliminates a header ($[u_1 \; u_2 \; \ldots \; u_{s+t}]$) contained in the decoded signal and outputs a restored signal ($[u_{s+t+1} \; u_{s+t+2} \; \ldots \; U_{N \times M}]$). While, in response to the demodulated signal v that is sent from the determiner 33, the header 31 eliminates a header ($[w_s \ y_t]=[v_1 \ v_2 \ldots v_{s+t}]$, $w_s=x_s$, $y_t=z_t$) contained in the demodulated signal v and outputs a restored signal ($c=[v_{s+t+1} \ v_{s+t+2} \ldots v_{N \times M}]$).

Figure 5:
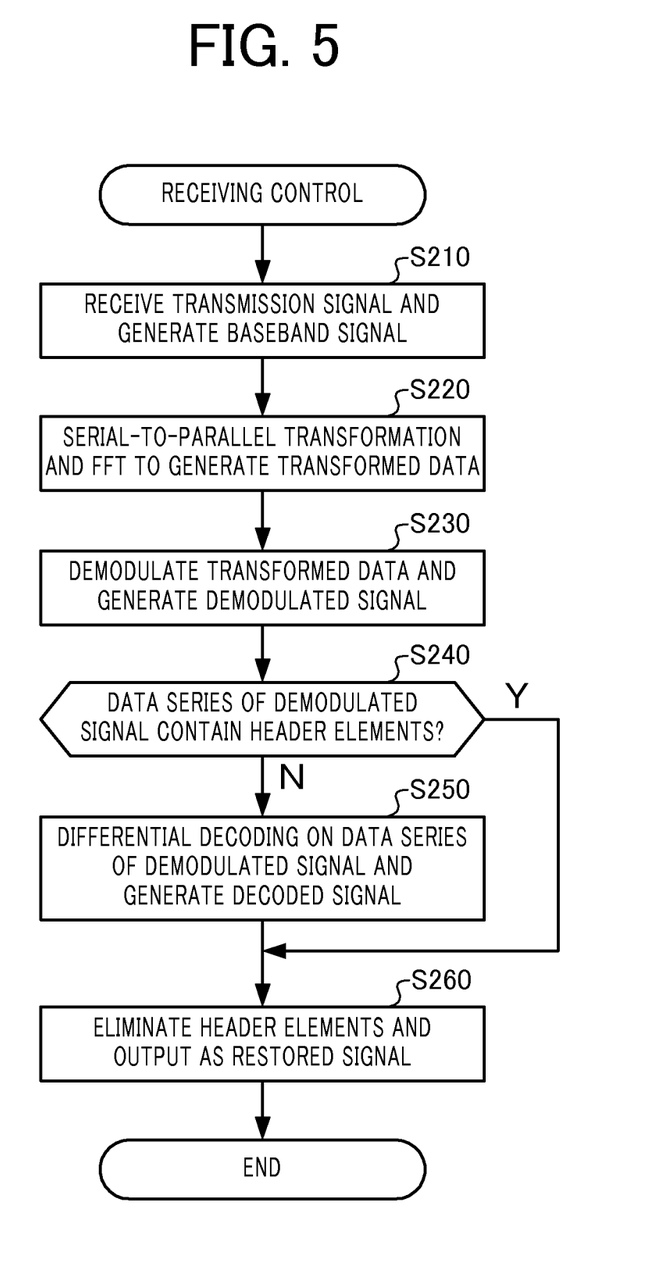
FIG. 5 is a flowchart representing an example of an operation relevant to a reception control performed by a communication device according to an embodiment of the present disclosure.

FIG. 5 is a flowchart representing an example of operations with regard to a receiving control executed by the communication device in the embodiment herein. The receiver 36 receives a transmission signal via the antenna 10 and the transmission/reception switch 37, and generates a baseband signal (step S210). The FFT calculator 35 performs a serial-to-parallel conversion of the baseband signal then performs the FFT on the parallel signal that is generated, and further generates a transformed data (step S220). The demodulator 34 demodulates the transformed data using the primary modulation and generates a demodulated signal v (step S230). The determiner 33 determines whether the data series of the demodulated signal v contains header elements (step S240).

The differential decoder 32 performs a differential decoding of a data series in the demodulated signal v if header elements are not contained in the data series of the demodulated signal v (step S240; N), and generates a decoded signal u (step S250). The header eliminator 31 eliminates a header ($[v_1 \ v_2 \ldots v_{s+t}]$) contained in the demodulated signal v if the data series of the demodulated signal v contains header elements (step S240; Y), then the header eliminator 31 outputs a restored signal ($[v_{s+t+1} \ v_{s+t+2} \ldots V_{N \times M}]$), and further, if the data series in the demodulated signal v does not contain the header elements (step S240; N, step S250), the header eliminator 31 eliminates header ($[u_1 \ u_2 \ldots u_{s+t}]$) contained in the decoded signal u, and outputs a restored signal ($[u_{s+t+1} \ u_{s+t+2} \ldots u_{N \times M}]$) (step S260). At this point, the processes at the receiver-side are complete.

As described above, the communication device 1 according to the embodiment of the present disclosure transmits the transmission signal that corresponds to the baseband signal having lower PAPR selected from the two baseband signals; that is, the baseband signal associated with the first signal a containing the input signal provided with the header, and the baseband signal associated with the second signal b obtained by differential encoding of the first signal a. Consequently, the communication device 1 according to the embodiment of the present disclosure achieves a reduction of the PAPR in OFDM communication compared to the conventional communication devices which transmit the transmission signals that correspond to the baseband signals associated with the input signals.

Details of Examples

Hereinafter, technical effects of the present disclosure of the embodiment are described in accordance with simulated results.

Simulation 1

A simulation is performed to draw a comparison between PAPR of the communication device 1 according to the embodiment and PAPR of a conventional communication device. In detail, baseband signals are generated using random signals for the input signals, and PAPRs of the communication device 1 in the embodiment and that of the conventional communication device are iteratively calculated. Here, the QPSK is used for the primary modulation, and the FFT size of 2048 is employed. The CCDF (Complementary Cumulative Distribution Function) characteristics of the PAPR between the communication device 1 of the embodiment and the conventional communication device, in other words, performances with regard to probabilities of occurrence of high PAPR are compared. In this simulation, the communication device 1 in the embodiment herein implements 15 elements to serve a fixed number of elements s for the first header $x_s$, five elements to serve a fixed number of elements t for the second header $z_t$ (s=15, t=5, $x_s$=[111111111111111] $z_t$=[00000]), and the rest of 4076 (2×2048−20=4076) bits are employed as the input signal (random signal) d to execute a transmission control shown in FIG. 4. Processes performed with the conventional communication device does not involve the aforementioned transmission processes but instead, the serial-to-parallel conversion of signals that are modulated using the primary modulation of 4096 (2×2048=4096) bit input signals (random signals) are executed, and a baseband signal is generated using the IFFT.

Figure 6:
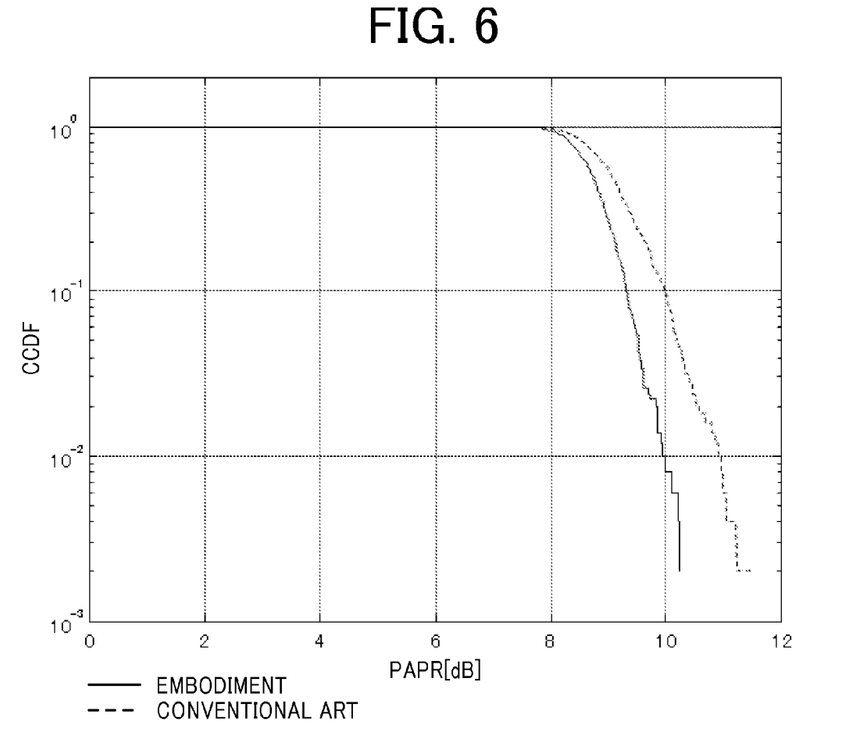
FIG. 6 illustrates an example of CCDF characteristics of PAPR for a communication device according to an embodiment of the present disclosure.

FIG. 6 shows an example of CCDF characteristics of PAPR in the communication device according to the embodiment. A result of Simulation 1 represented by a line graph in FIG. 6 depicts PAPR (unit: dB) on a horizontal axis and CCDF of the PAPR on a vertical axis. A solid line on the graph represents CCDF characteristics of PAPR for the communication device 1 in the embodiment, while a dashed line on the graph represents CCDF characteristics of PAPR for the conventional communication device. As shown in FIG. 6, the communication device 1 of the embodiment has a reduced rate of the occurrence of high PAPR, as the communication device 1 has a more compact CCDF characteristic than that of the conventional communication device. In this respect, the PAPR of the communication device 1 of the embodiment is indeed reduced against the PAPR of the conventional communication device.

Simulation 2

In the following, a simulation is performed to make comparison of PAPR by making the number of header elements to be varied while the input signal is fixed for the communication device 1 of the embodiment. In detail, 4090 bit input signal d ($d=[d_1 \ d_2 \ldots d_{4090}]$) is randomly selected a single type among them, and the number of elements in the second header $z_t$ is fixed to contain five elements, then the number of elements in the first header $x_s$ is changed from one element to 1000 elements. Further, a header containing 1000 elements per a single input signal is used to generate a set of 1000 baseband signals, and PAPR calculation is iteratively performed. It is noted that in this simulation, an approach employed for generating the 4096 bit first signal a involves decreasing the number of elements of the first bit position by one element per every one-element increase in the number of elements in the first header $x_s$. With this, the first signal a is generated according to $d=[d_1 \ d_2 \ldots d_{4090}]$ where s=1; $d=[d_2 \ d_3 \ldots d_{4090}]$ where s=2; and $d=[d_{1001} \ d_{1002} \ldots d_{4090}]$ where s=1000, and eventually, the baseband signal is generated.

Figure 7:
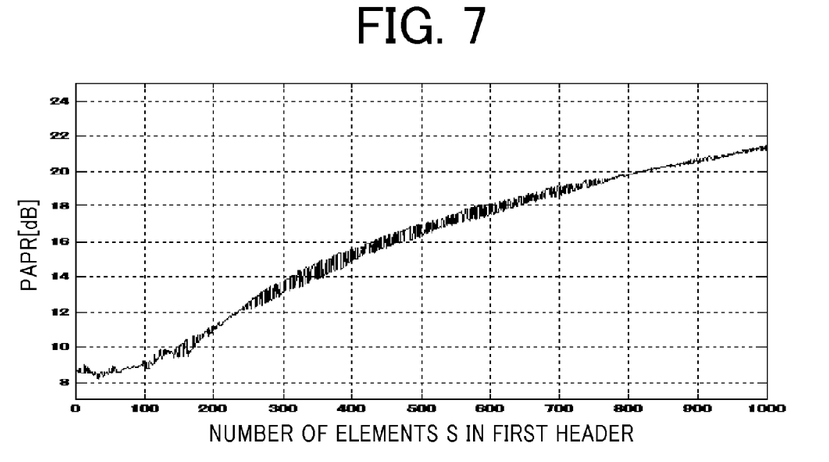
FIG. 7 illustrates an example of relationships between a header and PAPR in a communication device according to an embodiment of the present application.

FIG. 7 shows an example of relationships between the header of the communication device in the embodiment and PAPR. In a line graph depicting a result obtained by Simulation 2 presented in FIG. 7, a horizontal axis represents the number of elements s in the first header $x_s$ (unit: piece) and a vertical axis represents PAPR (unit: dB). In the results shown in FIG. 7, the lowest PAPR value is exhibited when the number of elements s in the first header $x_s$ is about 30 in the communication device 1 of the embodiment. By executing further iterations of the aforementioned Simulation 2, it is understood that PAPR value has a tendency to decrease when the number of elements s in the first header $x_s$ is within the range of about one to 200, yet the PAPR value tends to increase for the subsequent number of elements.

Simulation 3

A next simulation is performed to identify the number of headers that contribute to a high rate of generating low PAPR by making the number of elements in the header to be varied while having an unfixed input signal in the communication device 1 of the embodiment. To give detail, a set of 1000 signals is randomly selected in advance for 4090 bit input signal d, in addition, the number of element t in the second header $z_t$ is fixed to contain five elements, then the number of elements in the first header $x_s$ is changed from one element to 300 elements. For each signal of the set of 1000 input signals, 300 headers are used to generate a set of 300 baseband signals, then PAPR values are iteratively calculated. The header that gives the lowest PAPR for each input signal is identified. Note that in this simulation, the same approach used for generating the 4096 bit first signal a in Simulation 2 is used here as well.

Figure 8:
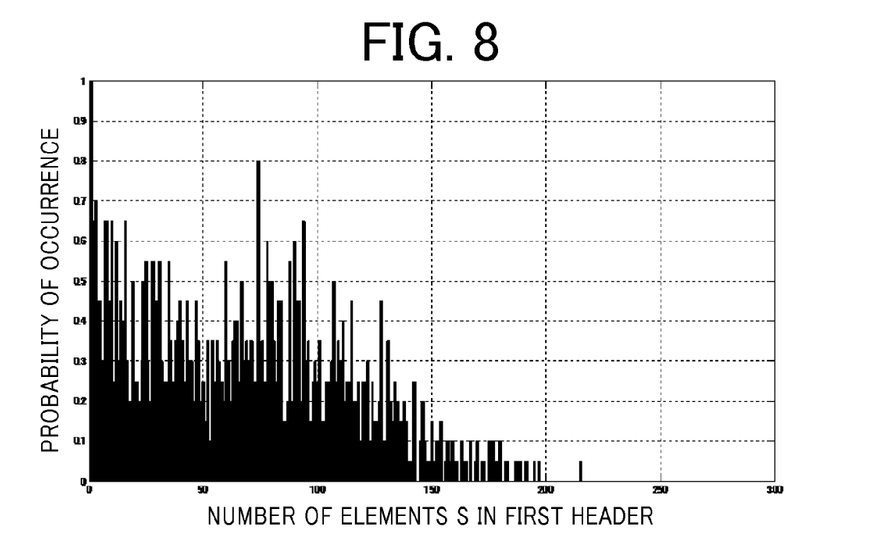
FIG. 8 illustrates an example of relationships between a header and a probability of occurrence of a lowest PAPR in a communication device according to an embodiment of the present disclosure.

FIG. 8 shows an example of relationships between the header in the communication device of the embodiment and probabilities of occurrence of the lowest PAPR. In a histogram depicting a result obtained by Simulation 3, a horizontal axis represents the number of elements s in the first header $x_s$ (unit: piece), while a vertical axis represents the probabilities of occurrence. As shown in FIG. 8, it is understood that the probability of occurrence of the lowest PAPR is high when the number of elements s in the first header $x_s$ is between one element to 200 elements, while the probability of occurrence of the lowest PAPR drops next to zero when the number of elements s in the first header $x_s$ take equal to or greater than 201 elements. According to this result, it is understood that the communication device 1 of the embodiment is yet less effective in reducing PAPR even by setting the number of elements s in the first header $x_s$ to be equal to or greater than 201 elements.

Simulation 4

The next simulation is performed to draw a comparison between the lowest PAPR in the communication device 1 of the embodiment with varied number of elements in the header, and the PAPR of the conventional communication device. In detail, a 4096 bit input signal d is randomly selected, in addition to having the number of elements t in the second header $z_t$ to be fixed as five elements, then the number of elements s in the first header $x_s$ are varied from one element to 200 elements. Further, the set of 200 headers are used for each randomly selected input signal to generate a set of 200 baseband signals, and PAPR is iteratively calculated. Subsequently, the processes for identifying the lowest PAPR within the calculated PAPR values are further reiterated. It is noted that in this simulation, the conventional communication device generates the baseband signal using the selected 4096 bit input signal d (d=[$d_1$ $d_2$ ... $d_{4096}$]), though the communication device 1 of the embodiment generates the baseband signal by generating the 4096 bit first signal a using the elements in the first-bit position through the 4090th-bit position ([$d_1$ $d_2$ ... $d_{4090}$]) among the 4090 bits input signals d. With regard to the approach for generating the 4096 bit first signal a, the same approach used in the aforementioned Simulations 2 and 3 are used here as well.

Figure 9:
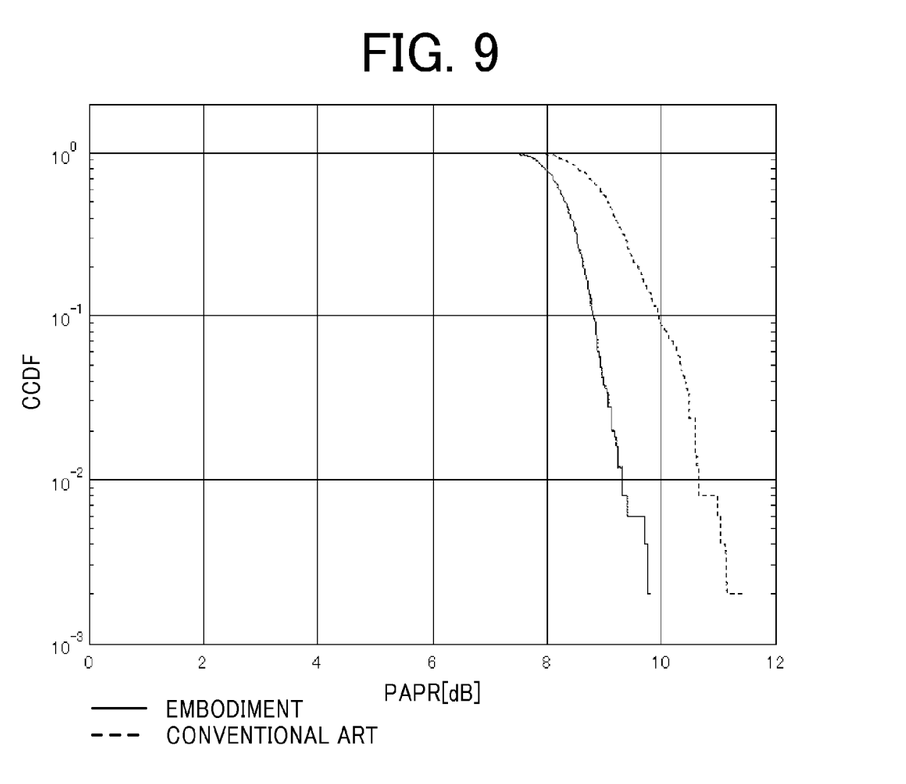
FIG. 9 illustrates an example of CCDF characteristics of a lowest PAPR in a communication device according to an embodiment of the present disclosure.

FIG. 9 shows an example of CCDF characteristics of the lowest PAPR in the communication device according to the embodiment. In a line graph depicting the result obtained by Simulation 4 in FIG. 9, a horizontal axis on the graph represents PAPR (unit: dB) and a vertical axis represents CCDF of PAPR. A solid line on the graph depicts the CCDF characteristics of PAPR for the communication device 1 of the embodiment, and a dashed line on the graph depicts the CCDF characteristics of PAPR of the conventional communication device. As shown in FIG. 9, it is understood that the communication device 1 of the embodiment has even more reduced CCDF characteristics over that of the conventional communication device. More specifically, as indicated by solid lines in FIG. 6 and FIG. 9, PAPR of the communication device 1 in the embodiment having selected with the first header $x_s$ that exhibits the lowest PAPR gains a reduction of PAPR by about 0.5 to 1.0 [dB] in comparison to when the first header $x_s$ employs fixed 15 bits with respect to the same CCDF values. Accordingly, this result indicates that the reduction effects by about 0.5 to 1.0 [dB] in PAPR of the communication device 1 of the embodiment is achieved when the first header $x_s$ exhibiting the lowest PAPR is selected, in comparison to when the fixed 15 bits of the first header $x_s$ are employed.

Simulation 5

A final simulation is performed to identify BER (Bit Error Rate) characteristics under fixed number of header elements in the communication device 1 of the embodiment. In detail, similar to the aforementioned Simulation 1, the number of elements s for the first header $x_s$ is fixed to 15 elements and the number of elements t of the second header $z_t$ is fixed to 5 elements while the remaining 4076 (2×2048−20=4076) bits are used for input signal (random signal) d to perform the processes of the transmission control and the reception control shown in FIGS. 4 and 5, and further, BER calculation is iteratively performed.

Figure 10:
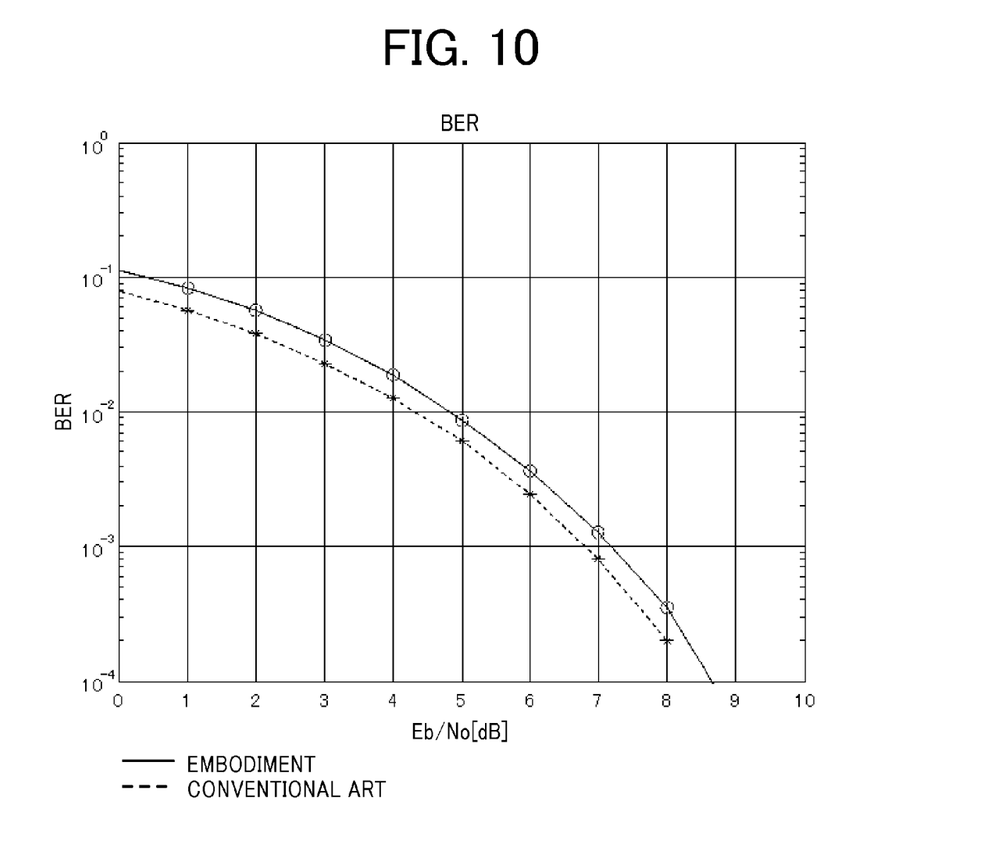
FIG. 10 illustrates an example of BER characteristics in a communication device according to an embodiment of the present disclosure.

FIG. 10 shows an example of BER characteristics in the communication device of the embodiment. On a line graph of FIG. 10 depicting a result obtained by Simulation 5, a horizontal axis represents Eb/No (Electric bit to Noise) (unit: dB) and a vertical axis on the graph represents BER. A solid line on the graph represents BER characteristics of the communication device 1 of the embodiment while a dashed line represents BER characteristics of the conventional communication device. FIG. 10 indicates that the communication device 1 of the embodiment exhibits higher BER compared to that of the conventional communication device at the same Eb/No, so that deterioration in the BER characteristics is shown.

The reasons for such results are considered due to the differential encoding that is performed on the first signal a to generate the second signal b in the communication device 1 of the embodiment. To put in another way, when the PAPR of the baseband signal with respect to the second signal b exhibits lower PAPR than the PAPR of the baseband signal for the first signal a, a transmission signal is generated based on the second signal b, then transmissions and receiving processes are further carried out. This requires another process at the receiver-side to generate the decoded signal u by performing a differential decoding on the demodulated signal v. In this regard, a two-bit error that is attributed to the differential decoding of a one-bit error in the demodulated signal v is considered to occur, which is considered as causes for such results.

Consider, for example, where the first signal a denotes a=[1110001], the second signal b denotes b=[1011110] (see formula (2)), and that low PAPR of a baseband signal with respect to the second signal b is being exhibited. In this, if the demodulated signal v contains no error and allows to write v=b=[1011110], a differential decoding can give the decoded signal u that matches the first signal a as in u=XOR([1011110], [0101111])=[1110001]=a. However, if an element $v_3$, for example, at the third bit position of the demodulated signal v has an error, and the demodulated signal v denotes v=[1001110], a differential decoding can give decoded signal u as in u=XOR([1001110], [0100111])=[1101001]. As a result, the decoded signal u fails to match the first signal a not only in the third bit element $u_3$ but also in the fourth bit elements $u_4$, therefore an error is created. Thus, the bit error of element $v_3$ in the third bit position of the demodulated signal v propagates through the fourth bit element of $u_4$ in the decoded signal u.

The aforementioned set of simulations indicate that by executing the aforementioned transmission and reception controls, the present disclosure according to the embodiment achieves the reduction of PAPR even though there is a potential risk for the deterioration in BER characteristics with respect to the conventional techniques. Note that since the header must to be provided to the communication device 1 in the embodiment, it is obvious that the efficiency of communication (transmission rate) is reduced by the size of the header compared to that of the conventional communication device, and thus, no additional simulation is considered necessary. The communication device 1 in the embodiment, for example, discussed in Simulations 3 and 4, contain maximum of 205 elements in the header because the first header $x_s$ contains maximum of 200 elements for s, that is, the number of elements, and the second header $z_t$ contains five elements for t, the number of elements. This indicates that the transmission rate is decreased by about 5% in maximum (($205/4096$)×100≈5 [%]).

Accordingly, the communication device 1 according to the embodiment achieves a reduction of PAPR that is more significant over the conventional communication device, and enables transmissions and receptions of the transmission signals with more ideal CCDF values even though the efficiency of communication may be deteriorated and also the BER performance may be deteriorated by as much as the amount of headers, compared to the conventional communication device.

It is noted that the embodiment of the present disclosure is not limited to the foregoing embodiment. As for the communication device 1 of the embodiment, the header is provided by the header provider 11 at the position that is ahead of the set of element $d_1$ in the first bit position of the input signal d, and the header is eliminated by the header eliminator 31. However, the present disclosure is not limited to such configurations. For instance, instead of these header provider 11 and the header eliminator 31, a footer provider (identification provider) may be employed to provide a footer (identification data) at the location subsequent to the element $d_{N\times M-s-t}$ at the last bit section (N×M−s−t) of the input signal d, and a footer eliminator (identification eliminator) may be employed to eliminate the footer. The communication device 1 of the embodiment is configured to provide and eliminate the header only, though the communication device 1 may certainly be configured, for example, to provide and eliminate the footer in addition to the header.

Yet further, with regard to the header provided by the header provider 11, the first header represents the data series that contains s-elements that are all 1s while the second header represents the data series containing t-elements that are all constituted by 0s ($x_s$=[11 . . . 1], $z_t$=[00 . . . 0]). However, the embodiment of the present disclosure is not limited to such configurations and that the first header may employ the data series containing s-elements that are all 0s, and the second header may employ the data series containing t-elements that are all 1s ($x_s$=[00 . . . 0], $z_t$=[11 . . . 1]). Yet further, the first header may employ, for example, the data series containing s-elements which include 1s only in the very first and the last positions while the rest of the elements are constituted by 0s, and the second header may employ the data series containing t-elements among which, only the very first and the last elements take 0s while all the rest of the elements are constituted by is ($x_s$=[10 . . . 01], $z_t$=[01 . . . 10]).

Even further, by presetting the number of elements t for the second header $z_t$ in the respective communication device 1 on the transmission-side and on the receiver-side, the header can be entirely eliminated using the header eliminator 31 by identifying the second header $z_t$ based on the number of consecutive "0" elements. In this respect, the number of elements s in the first header $x_s$ may be varied to have any arbitrary number of elements. The communication device 1 on the transmission-side and on the receiver-side each may, for example, preset the number of elements t as five for the second header $z_t$, and use any arbitrary number of elements for s in the first header $x_s$. Particular preference is given to the number of elements s in the first header $x_s$ to be preset within the range of one to 200 as such range of numbers is associated with the better CCDF performance and the high likelihood (probability) of yielding the reduced PAPR. The communication device 1 on the transmission-side may be configured to identify the number of elements s in the first header $x_s$ that produces the lowest PAPR within the range of one to 200 elements at every input of the input signal d is made, then to provide the input signal d with a header containing the identified number of elements s in the first header $x_s$ along with the second header $z_s$ having the preset number of elements t (for example, five), to generate a transmission signal. Consequently, transmissions and receptions of the transmission signals generated by the baseband signals that always produce the lowest PAPR are achieved.

Further with regard to the differential encoder 12 and the differential decoder 32, the initial value used for the exclusive-OR operation on the first bit elements is not limited to 0 but a value 1 may be employed as the initial value. As for the differential encoder 12, the second signal is generated using the differential encoder 12 where the second signal constituted by the elements that are obtained by the exclusive-OR operation on each element of the first signal a and each one-bit delay element, performed in sequence from the first bit element ($a_1$=1) to the N×Mth bit element ($a_{N\times M}=d_{N\times M-s-t}$). However, a method for generating the second signal is not limited to such method described above, and that the exclusive-OR operation may certainly be performed using each of more than two-bit delay elements on which an exclusive-OR has been performed. For instance, the second signal may be generated using two sets of initial value 0s and performing an exclusive-OR on each two-bit delay element on which an exclusive-OR has been performed, such that the second signal is constituted by elements representing such values obtained using the exclusive-OR. Importantly, the differential decoder 32 has to generate a decoded signal constituted by elements that represent values obtained using an exclusive-OR on each two-bit delay element using two sets of initial value 0s, as the exclusive-OR being performed in sequence from the first bit element $v_1$ to the N×Mth bit element $v_{N\times M}$ of the demodulated signal v.

As for the primary modulation used by the modulator 13 and the decoder 34, which is not limited to QPSK but modulations other than QPSK such as PSK (Phase Shift Keying) and QAM (Quadrature Amplitude Modulation) may be used. The IFFT calculator 14 may be configured to perform IDFT as an alternative to IFFT, and the IFFT calculator 35 may perform DFT as an alternative to FFT. The IFFT calculator 14 indeed performs the serial-to-parallel conversion on the first modulated data and on the second modulated data, yet this serial-to-parallel conversion may be performed by features other than the IFFT calculator 14. The modulator 13, for example, may perform the serial-to-parallel conversion on the first modulated data and on the second modulated data. Further, the FFT calculator 35 indeed performs the serial-to-parallel conversion of the baseband signals, though features other than the FFT calculator 35 may certainly be used to perform the serial-to-parallel conversion thereof. A receiver 36, for example, may be used for the serial-to-parallel conversion of the baseband signals.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication device that communicates with another device in orthogonal frequency-division multiplexing wireless communication, comprising:
    an identification provider that provides predetermined identification data to an input signal, and generates a first signal;
    a differential encoder that performs a differential encoding of a data series, that is an aggregate of data having a matching number of elements to that contained in the first signal, and generates a second signal;
    a modulator that modulates each of the first signal and the second signal using a primary modulation, and generates first modulated data and second modulated data;
    an IFFT calculator that performs an inverse fast Fourier transformation on each of the first modulated data and the second modulated data, and generates first inverse transformed data and second inverse transformed data;
    a selector that compares a peak-to-average power ratio calculated by a baseband signal associated with the first inverse transformed data and a peak-to-average power ratio calculated by a baseband signal associated with the second inverse transformed data, and selects a baseband signal having a lower peak-to-average power ratio; and
    a transmitter that generates a transmission signal based on the selected baseband signal, and transmits the transmission signal.

2. The communication device according to claim 1, wherein
    the predetermined identification data comprises first identification data having an arbitrary number of elements and second identification data having a predetermined number of elements, and
    the data series is capable of identifying elements of the input signal and elements of the predetermined identification data based on the number of elements in the second identification data.

3. The communication device according to claim 2, wherein
    the elements of the first identification data are constituted by all 1s or all 0s, and
    the elements of the second identification data are constituted by all 0s if the elements of the first identification data are all 1s, and that the elements of the second identification data are constituted by all 1s if the elements of the first identification data are all 0s.

4. The communication device according to claim 1, wherein
    the number of elements in the predetermined identification data is set based on a probability of occurrence of a low peak-to-average power ratio of the baseband signal.

5. The communication device according to claim 2, wherein
    the number of elements in the first identification data is set to have a peak-to-average power ratio that is lowest within a range that is set based on a probability of occurrence of the low peak-to-average power ratio of the baseband signal.

6. The communication device according to claim 1, wherein
    the differential encoder performs an exclusive-OR on each element of the first signal and a one or more than one bit delayed element yielded by an exclusive-OR of the second signal, such that the second signal is generated.

7. The communication device according to claim 1, further comprising:
    a receiver that receives a transmission signal and generates a baseband signal;
    an FFT calculator that performs a fast Fourier transformation on a parallel signal generated by a serial-to-parallel conversion performed on the baseband signal, and generates transformed data;
    a demodulator that demodulates the transformed data using a primary modulation and generates a demodulated signal;
    a determiner that determines whether a data series contains elements from the predetermined identification data, where the data series is an aggregate of data having a matching number of elements to that contained in the demodulated signal;
    a differential decoder that performs a differential decoding of the data series if the data series does not contain any elements of the predetermined identification data, and generates a decoded signal; and
    an identification eliminator that eliminates the elements of the predetermined identification data contained in the demodulated signal if the data series contains the elements from the predetermined identification data, and eliminates the elements of the predetermined identification data contained in the decoded signal if the data series does not contain the elements from the predetermined identification data, such that a restored signal is output.

8. The communication device according to claim 7, wherein
    the predetermined identification data comprises first identification data having an arbitrary number of elements and second identification data having a predetermined number of elements, and
    the identification eliminator identifies whether a data series of the demodulated signal and a data series of the decoded signal contain the elements of the predetermined identification data, based on the number of elements contained in the second identification data.

9. The communication device according to claim 7, wherein
    the predetermined identification data comprises first identification data having an arbitrary number of elements and a second identification data having a predetermined number of elements, and
    the determiner determines whether the elements of the predetermined identification data are contained in the data series, based on the number of elements contained in the second identification data.

10. The communication device according to claim 7, wherein
    the differential decoder performs an exclusive-OR on each element of the data series and a one bit or more than one bit delayed element of the data series, if the data series does not contain any elements of the predetermined identification data, such that the decoded signal is generated.

11. A communication method for a communication device that communicates with another device in orthogonal frequency-division multiplexing wireless communication, comprising the steps of:
providing predetermined identification data to an input signal, and generating a first signal;
performing a differential encoding on a data series that is an aggregate of data having a matching number of elements to that contained in the first signal, and generating a second signal;
modulating each of the first signal and the second signal using a primary modulation, and generating first modulated data and second modulated data;
performing an inverse fast Fourier transformation on the first modulated data and the second modulated data, respectively, and generating first inverse transformed data and second inverse transformed data;
comparing a peak-to-average power ratio calculated by a baseband signal associated with the first inverse transformed data and a peak-to-average power ratio calculated by a baseband signal associated with the second inverse transformed data, and selecting a baseband signal having a lower peak-to-average power ratio; and
generating a transmission signal based on the selected baseband signal, and transmitting the transmission signal.

12. The communication method set forth in claim 11, further comprising the steps of:
receiving a transmission signal and generating the baseband signal;
performing a fast Fourier transformation on a parallel signal generated by a serial-to-parallel conversion on the baseband signal, and generating transformed data;
demodulating the transformed data using a primary modulation and generating a demodulated signal;
determining whether the data series contains elements of predetermined identification data, that is an aggregate of data having a matching number of elements to that contained in the demodulated signal;
performing a differential decoding of the data series if the data series does not contain any elements of the predetermined identification data, and generating a decoded signal; and
eliminating the elements of the predetermined identification data contained in the demodulated signal if the data series contains the elements of the predetermined identification data, and eliminating the elements of the predetermined identification data contained in the decoded signal if the data series does not contain any elements of the predetermined identification data, such that a restored signal is output.

* * * * *